United States Patent [19]

Schmit et al.

[11] Patent Number: 5,123,632
[45] Date of Patent: Jun. 23, 1992

[54] METHOD FOR THE PNEUMATIC INJECTION OF METERED QUANTITIES OF POWDERED SUBSTANCES INTO A CHAMBER AT A VARIABLE PRESSURE

[75] Inventors: Louis Schmit, Luxembourg; Yvon Kroemmer, Goetzingen; Leon Ulveling, Luxembourg, all of Luxembourg

[73] Assignee: Paul Wurth S.A., Luxembourg

[21] Appl. No.: 479,440

[22] Filed: Mar. 7, 1990

[51] Int. Cl.⁵ .............................................. C21B 7/16
[52] U.S. Cl. ........................................ 266/47; 75/460
[58] Field of Search ................... 75/460; 266/182, 47

[56] References Cited

U.S. PATENT DOCUMENTS

| | | |
|---|---|---|
| 3,365,242 | 1/1968 | Marchetti. |
| 4,014,577 | 3/1977 | Clancy et al. |
| 4,389,244 | 6/1983 | Yarosheysky et al. ............... 75/460 |
| 4,702,182 | 10/1987 | Ulveing et al. ...................... 110/347 |

FOREIGN PATENT DOCUMENTS

| | | |
|---|---|---|
| 235562 | 9/1987 | Fed. Rep. of Germany. |
| 1-230706 | 9/1989 | Japan ................................. 75/460 |
| 270013 | 6/1988 | Luxembourg. |

OTHER PUBLICATIONS

Patent Abstract of Japan-vol. 7, No. 74 (M-203) [1219] Mar. 26, 1983 (Seisakusho).
Patent Abstract of Japan-vol. 7, No. 143 (C-172) [1288] Jun. 22, 1983 (Kogyo).
Patent Abstract of Japan-vol. 7, No. 169 (M-231) [1314] Jul. 26, 1983 (Seitetsu).

*Primary Examiner*—Melvyn J. Andrews
*Attorney, Agent, or Firm*—Fishman, Dionne & Cantor

[57] ABSTRACT

The method consists in forming in a single metering device a pneumatic mixture comprising the powdered substances and the propellent gas, in propelling this mixture through a common main 18 into a distributor 20 in which the mixture is split into secondary currents which are sent to each of the injection points respectively through secondary pipes $22_1, 22_2, \ldots 22_n$, in determining the flow rate in each of the secondary pipes $22_1, 22_2, \ldots 22_n$ by the tuyere $28_1, 28_2, \ldots 28_n$ flow cross-sections and in influencing the transport conditions in each secondary pipe $22_1, 22_2, \ldots 22_n$ by acting on the pressure P3 downstream from each tuyere $28_1, 28_2, \ldots 28_n$ in order to maintain this pressure at a determined value.

The method is aimed more particularly at the injection of powdered coal into a blast furnace.

7 Claims, 2 Drawing Sheets

METHOD FOR THE PNEUMATIC INJECTION OF METERED QUANTITIES OF POWDERED SUBSTANCES INTO A CHAMBER AT A VARIABLE PRESSURE

TECHNICAL FIELD

The present invention relates to a method for injecting, by a pneumatic method, metered quantities of powdered substances, at different points, into a chamber which is at a variable pressure.

With no limitations being implied, the invention will be described more particularly with reference to its preferred application, in other words the injection of solid fuels, in particular powdered coal, into an industrial furnace, such as a blast furnace.

BACKGROUND OF THE INVENTION

Among the known methods and plants for injecting solid fuels into a tank furnace, two different types can essentially be distinguished. In the plants of the first type, the powdered coal is released under pressure from a distributing hopper into a series of metering apparatuses in which the mixture of powdered coal and propellent gas is formed and from which the mixture thus formed is conveyed towards the points for injection into the tank furnace. In these plants, one metering apparatus is generally employed for each tuyere stock or for each pair of tuyere stocks, with the result that the quantities injected through the tuyere stocks may be metered individually. These plants have the advantage of enabling a high degree of accuracy of the individual flow rates. On the other hand, they have the disadvantage that they require many relatively long pipes between the distribution hopper and the tank furnace. Furthermore, metering may be made difficult by the various variable parameters, in particular fluctuations in pressure inside the furnace, which have repercussions on the cost of the plant, because of the need for numerous measurements and regulations loops.

In the second type of plant, only one metering device is employed at or downstream from the distribution hopper. In this metering apparatus, the overall flow rate of the powdered coal is regulated so as to inject a predetermined quantity of powdered coal per unit time. These plants use the method described in the introduction, in other words the metered current containing the required quantity of coal is divided in a distributor into identical secondary currents. These plants have the advantage that the distributor is arranged in immediate proximity to the furnace so as to reduce the length of the secondary pipes and, consequently, the space requirement around the furnace.

On the other hand, these plants have the disadvantage that the variable parameters, in particular fluctuations in the pressure in the furnace, must be controlled, as well as the influence of the features of the various pipes, in order to obtain a uniform or determined distribution of the overall flow rate metered to the various tuyere stocks, as these parameters all influence the pressure gradient in the secondary pipes and, consequently, the flow rate of the powdered coal in these pipes. Various strategies have already been provided for this purpose. It has, for example, already been proposed to deliberately lengthen some pipes, or to provide them with calibrated flow orifices in order to compensate for the influences of the differences in the features of the pipes which are, for example, varying lengths, their cross-section of flow resulting from manufacturing tolerances or from wear and the influence of their layout (horizontal, vertical or oblique). However, both these differences and the measurements necessary to compensate for their influences are very difficult to detect and to determine. Furthermore, these compensatory or corrective measures do not enable the influence of the variations in pressure in the furnace to be eliminated.

Another solution is described in U.S. Pat. No. 4,702,182, the disclosure of which is incorporated by reference, and consists of providing a tuyere or a narrowed cross-section, either in the secondary pipes or in the distributor, where a pressure head is created necessary for acceleration of the pneumatic current up to the speed of sound. Acceleration of the pneumatic current up to the speed of sound has the advantage that the flow conditions upstream from the point where the supercritical speed is produced are no longer influenced by the flow conditions downstream from this point. This has, of course, the great advantage that it is no longer necessary to take into account the fluctuations in pressure and other variable parameters existing in the secondary pipes or in the chamber into which the powdered substances are injected. However, the tuyeres necessary for the acceleration up to the speed of sound require a high pressure head and a relatively small flow cross-section, which gives rise to a high pressure at the inlet and a high consumption of propellent gas and requires preliminary screening of the powdered coal in order to remove the coarse particles and to prevent risks of obstructing the tuyeres.

SUMMARY OF THE PRESENT INVENTION

The object of the present invention is to provide a novel method which enables a uniform or determined distribution of the powdered substances in the secondary pipes and the influence of the variable parameters on this distribution to be eliminated.

In order to achieve this object, the method proposed by the present invention is essentially characterized in that the flow rate is determined in each of the secondary pipes by the tuyere flow cross-sections and that the transport conditions in each secondary pipe are influenced by acting on the pressure downstream from each tuyere in order to maintain this pressure at a determined value.

The method proposed is based on the recognition that all the variable parameters downstream from the tuyere affect the flow rate of the powdered coal through these tuyeres by modifying the pressure immediately downstream from the tuyere, in other words by varying the pressure head or head loss in this tuyere. In other words, by providing means to compensate the effects of the variable parameters on the pressure downstream from the tuyeres, so as to maintain the pressure at a determined value, the flow rate through these tuyeres, which is determined by their flow cross-section, is no longer affected by unwanted variations in pressure head as these variations are determined in all the tuyeres, given that the downstream pressure is maintained at a determined value and that the upstream pressure is determined as desired.

Although these tuyeres give rise to an acceleration of the pneumatic current, this acceleration remains far below the speed of sound, with the result that the pressure upstream from the tuyeres may be maintained at a lower level and that the flow cross-sections of the tuyeres may be wider than those employed in the methods operating at the speed of sound.

According to a first embodiment, the pressure is acted upon by injecting a compensating gas at a determined pressure downstream from each tuyere.

It is possible to either inject the gas at the same pressure in all the pipes or to regulate the injection pressure of the compensating gas as a function of a measurement of the pressures in each of the secondary pipes downstream from the tuyeres.

In order to reduce the consumption of compensating gas, compensating tuyeres may advantageously be provided in each of the second pipes downstream from the tuyeres, in order to compensate the differences in the features between the various secondary pipes.

According to a second embodiment, the pressure is measured downstream from each of the tuyeres and this pressure is regulated using a regulating valve incorporated into each of the secondary pipes so as to obtain a constant pressure head through each of the tuyeres.

BRIEF DESCRIPTION OF THE DRAWINGS

Other characteristics and features of the invention will emerge from the detailed description of some embodiments given hereinbelow by way of illustration, with reference to the attached drawings in which.

DETAILED DESCRIPTION OF THE INVENTION

Figure 1:
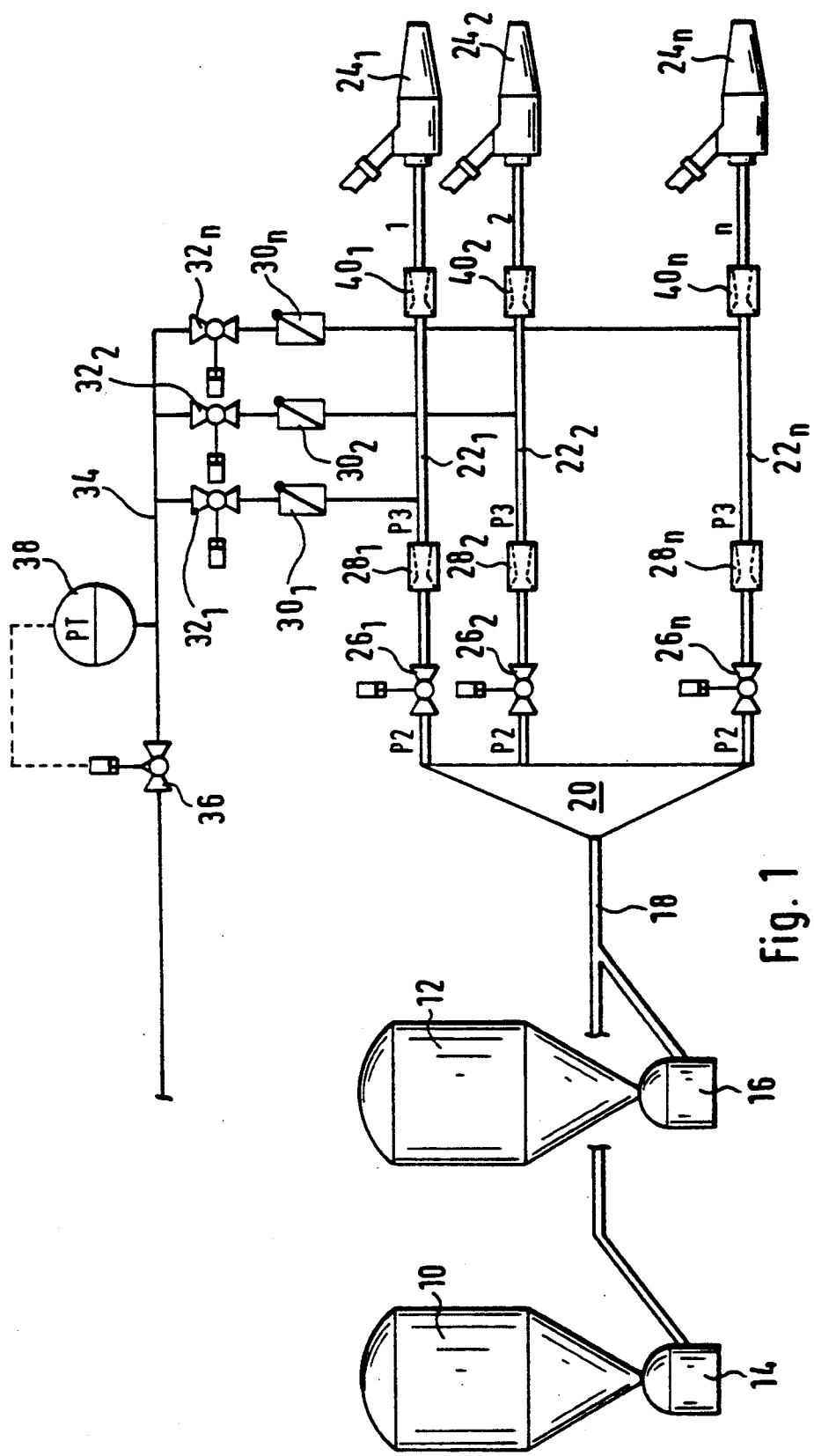
FIG. 1 diagrammatically illustrates a first embodiment of the method proposed by the present invention.

FIG. 1 shows two silos 10, 12 in which the powdered coal is stored which is intended to be sent into a blast furnace in order to maintain the combustion process. The total flow rate of the powder to be injected into the furnace is regulated in two metering apparatuses 14, 16 which are alternately connected by a main 18 to a distributor 20 which may be of the type described in the document U.S. Pat. No. 4,702,182. In this distributor, the primary pneumatic current is split into secondary currents which are forwarded through secondary pipes $22_1, 22_2, \ldots 22_n$ to tuyere stacks $24_1, 24_2 \ldots 24_n$ of a blast furnace. Each pipe $22_1, 22_2, \ldots 22_n$ has a closing valve $26_1, 26_2, \ldots 26_n$ for cutting, as desired, one or more tuyere stocks $24_1, 24_2, \ldots 24_n$ from the distribution circuit.

The flow rate in each secondary pipe $22_1, 22_2, \ldots 22_n$ is determined by the flow cross-section of a tuyere $28_1, 28_2 \ldots 28_n$ provided in each of the secondary pipes downstream from the valves $26_1, 26_2, \ldots 26_n$. This flow cross-section of a tuyere $28_1, 28_2 \ldots 28_n$ provided in each of the secondary pipes downstream from the valves $26_1, 26_2, \ldots 26_n$. This flow cross section is larger than that of the so-called critical-speed tuyeres with the result that risks of obstructions are virtually eliminated and that the system operates with a pressure $P_2$ which is considerably smaller upstream from the tuyeres.

Although the flow rate of the powdered coal through the tuyeres $28_1, 28_2 \ldots 28_n$ is determined by the flow cross-sections of the latter, this flow rate is nevertheless dependent on the pressure head through these tuyeres, in other words on the ratio $P_2/P_3$. Now, if $P_2$ remains constant, $P_3$ is subjected to the influence of the fluctuations in pressure in the furnace and is dependent on the physical parameters of the secondary pipes, as explained hereinabove.

In order to overcome this, the invention proposed artificially maintaining a given pressure $P_3$ downstream from each of the tuyeres $28_1, 28_2, \ldots 28_n$ downstream from the tuyeres $28_1, 28_2, \ldots 28_n$ through a non-return flap $30_1, 30_2, \ldots 30_n$ and a closing valve $31_1, 32_2, \ldots 32_n$ to a pipe 34 for a compensating gas. The pressure of the gas in the pipe is set at a value PT by a regulating valve 36 controlled by a manometer 38 with the result that the pressure $P_3$ downstream from all the tuyeres is established and maintained at the same value PT. The value of PT may be determined empirically with a plant is installed by measuring $P_3$ in each of the secondary pipes $22_1, 22_2, \ldots 22_n$ for varying flow rates of coal and by selecting for a given flow rate a value PT which is equal to at least the strongest of the n pressures measured in the n secondary pipes $22_1, 22_2, \ldots 22_n$.

During operation of the system, the influence of the parameters or fluctuations which tends to modify one or more pressures $P_3$ downstream from the tuyeres is automatically compensated by a more or less strong induction of compensating gas at the pressure PT, which means that all the pressures $P_3$ are maintained permanently at the value PT, independently of the downstream parameters or fluctuations.

It is possible to reduce the consumption of compensating gas by providing in each of the secondary pipes $22_1, 22_2, \ldots 22_n$ compensating tuyeres $40_1, 40_2, \ldots 40_n$ which are given dimensions so as to compensate the differences between the features of the secondary pipes $22_1, 22_2, \ldots 22_n$ such as differences in length, cross-section, layouts etc. . . . , and which normally have repercussions on the value of $P_3$.

Figure 2:
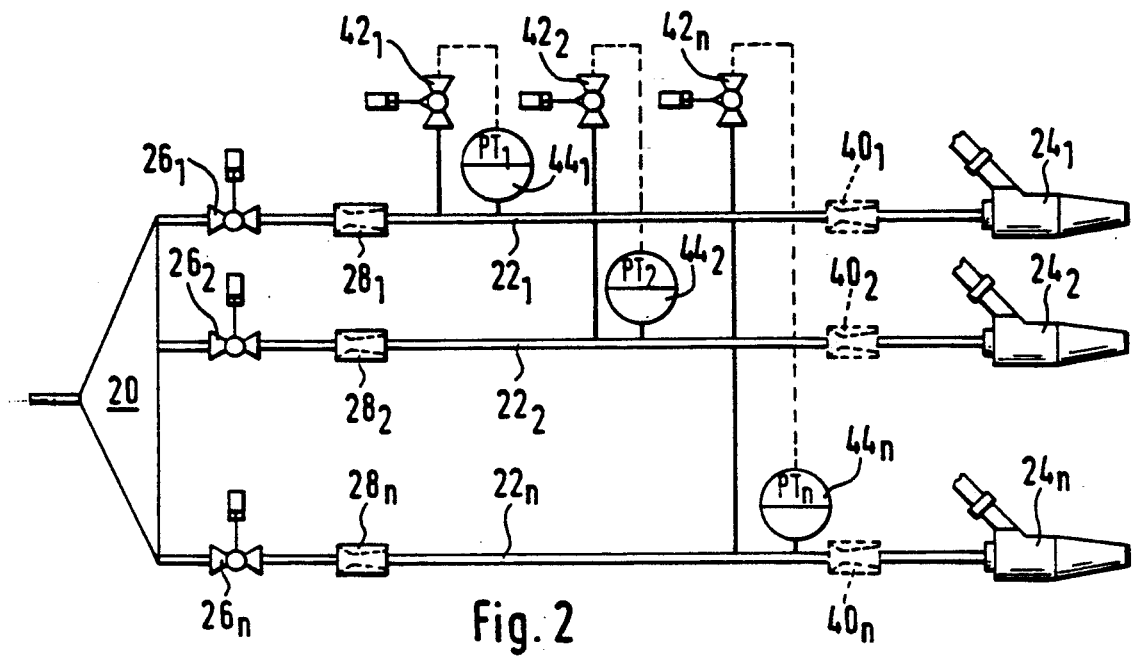
FIG. 2 diagrammatically illustrates a second embodiment of the method proposed by the present invention and FIG. 3 diagrammatically illustrates a third embodiment of the method proposed by the present invention.

Instead of creating the same pressure PT downstream from all the tuyeres $28_1, 28_2, \ldots 28_n$ as in FIG. 1, it is possible to regulate these pressures individually, as in FIG. 2.

For this purpose, each secondary pipe $22_1, 22_2, \ldots 22_n$ is connected to the pipe 34 for the compensating gas through a regulating valve $42_1, 42_2, \ldots 42_n$ controlled by a pressure transmitter $44_1, 44_2, \ldots 44_n$ which measures the pressure $P_3$ in the secondary pipe in question $22_1, 22_2, \ldots 22_n$. The pressures $P_3$ downstream form the tuyeres are thus maintained at pressures $PT_1, PT_2, \ldots PT_n$ which may vary from one secondary pipe to another, but which are maintained at all times at the same value in a specific secondary pipe.

Figure 3:
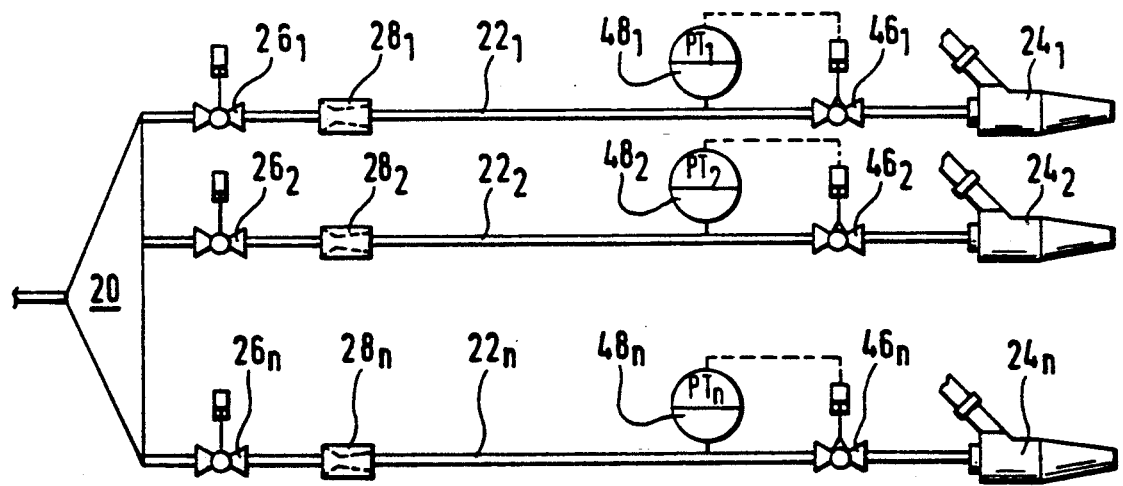

FIG. 3 shows a different embodiment in which the pressures downstream from the tuyeres $28_1, 28_2, \ldots 28_n$ are maintained constant not by using a compensating gas, but by modifying the flow cross-sections of the secondary pipes. For this purpose, a regulating valve $46_1, 46_2, \ldots 46_n$ is provided in each of the secondary pipes $22_1, 22_2, \ldots 22_n$ under the automatic control of a manometer $48_1, 48_2, \ldots 48_n$ which measures the pressure in the pipe in question. Any tendency for the pressure $P_3$ to deviate from a reference pressure $PT_1, PT_2, \ldots PT_3$ for example under the influence of fluctuations in pressure in the furnace, is thus automatically compensated by a corrective modification of the flow cross-section a the regulating valve in question 46 which maintains the pressures $PT_1, PT_2, PT_3$ constant.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A method for injecting metered quantities of a powdered material at separate injection points within a chamber at variable pressure, comprising:
   forming a primary pneumatic stream, said primary pneumatic stream comprising the powdered material and a propellant gas;
   splitting the primary pneumatic stream into a plurality of secondary pneumatic streams;
   directing the secondary pneumatic streams through separate respective conduits to respective separate injection points, each conduit including a first tuyere disposed upstream of the respective injection point, and each first tuyere having an inlet end and an outlet end and defining a constricted flow passage between the inlet end and the outlet end; wherein each secondary pneumatic stream exhibits a first tuyere outlet pressure at the outlet end of its respective first tuyere; and acting on the outlet pressure of each respective first tuyere at a point downstream of the respective first tuyere and upstream of the respective injection point to influence the transport conditions within each respective conduit.

2. The method of claim 1, wherein the outlet pressure of each respective first tuyere is acted upon by introducing a pressure compensating gas stream into each conduit at a point down stream of the respective first tuyere and upstream of the respective injection point.

3. The method of claim 2, wherein the pressure compensating gas is injected into each conduit at a first pressure.

4. The method of claim 2, wherein the first tuyere outlet pressure is measured in each conduit and the pressure compensating gas is regulated to provide the same first tuyere outlet pressure in each conduit.

5. The method of claim 1, wherein each conduit further comprises a compensating tuyere downstream from each respective first tuyere and upstream of each respective injection point for compensating for differences between the conduits.

6. The method of claim 1, further comprising:
   measuring the first tuyere outlet pressure in each respective conduit; and
   regulating the first tuyere outlet pressure in each respective conduit, by adjusting respective regulating valves disposed in said respective conduits downstream of said respective first tuyeres and upstream of said respective injection points to provide constant pressure heads through each of the first tuyeres.

7. The method of claim 1 wherein each injection point comprises a second tuyere, wherein said second tuyere is a tuyere stock.

* * * * *